United States Patent [19]

Sato et al.

[11] Patent Number: 4,870,221

[45] Date of Patent: Sep. 26, 1989

[54] OIL-FILLED CAPACITOR

[75] Inventors: Atsushi Sato, Tokyo; Shigenobu Kawakami, Ichikawa; Keiji Endo, Yokosuka; Hideyuki Dohi, Yokohama, all of Japan

[73] Assignee: Nippon Petrochemicals Co., Ltd., Tokyo, Japan

[21] Appl. No.: 97,502

[22] Filed: Sep. 16, 1987

[30] Foreign Application Priority Data

Sep. 17, 1986 [JP] Japan ................. 61-218656

[51] Int. Cl.$^4$ ............................. H01B 3/22
[52] U.S. Cl. .................... 585/6.3; 252/567; 252/570; 361/315; 585/6.6
[58] Field of Search ............. 252/567, 570; 585/6.3, 585/6.6; 361/315

[56] References Cited

U.S. PATENT DOCUMENTS

| 4,111,824 | 9/1978 | Schulz et al. | 585/6.3 |
| 4,347,169 | 8/1982 | Sato et al. | 252/567 |
| 4,493,943 | 1/1985 | Sato et al. | 585/6.3 |
| 4,568,793 | 2/1986 | Sato et al. | 585/24 |
| 4,672,730 | 2/1987 | Sato et al. | 585/6.3 |

FOREIGN PATENT DOCUMENTS 115065 8/1984 European Pat. Off. ............. 585/6.3

Primary Examiner—Robert A. Wax
Attorney, Agent, or Firm—Scully, Scott, Murphy & Presser

[57] ABSTRACT

An improved oil-filled capacitor which is excellent in low temperature characteristics. The oil-filled capacitor is composed of at least partially a plastics material and is impregnated with an electrical insulating oil which oil is characterized in that it comprises 0 to 100% by weight of a fraction A containing components boiling within the range of 268° to 275° C. (atmospheric pressure basis) and 100 to 0% by weight of a fraction B containing components boiling within the range of 280° to 310° C. (atmospheric pressure basis) which fractions are recovered by distillation from the heavy by-product oil that is produced in the preparation of ethylbenzene by alkylating benzene with ethylene in the presence of an alkylation catalyst and the ratio of the integrated intensity as chemical shift at 120 to 155 ppm of the spectrum measured by $C^{13}$ NMR method to the total integrated intensity at 0 to 155 ppm of the spectrum it 80% or higher with regard to said fraction A and the same ratio is 72% or higher with regard to said fraction B.

8 Claims, No Drawings

OIL-FILLED CAPACITOR

BACKGROUND OF THE INVENTION

1. Field of the Invention

This invention relates to an oil-filled capacitor which is impregnated with an electrical insulating oil that is prepared from the by-product oil fractions obtained in the process to prepare ethylbenzene. Furthermore, the invention relates to an oil-filled capacitor which is impregnated with an electrical insulating oil comprising a specific fraction or its mixture derived from the above-mentioned by-product oil.

2. Description of the Prior Art

It is well known that a heavy by-product oil is produced in the process to prepare ethylbenzene by reacting benzene with ethylene in the presence of an alkylation catalyst as disclosed in, for example, U.S. Pat. Nos. 4,108,788; 4,111,825; and 4,228,024.

In the same reference, it is described that the fraction having a boiling range of 275 to 420° C. is useful as an electrical insulating oil.

The present inventors recovered the fraction described in the above reference by distillation and used it for the impregnation of oil-filled capacitors made by using polypropylene film. However, it was found out that capacitors having excellent characteristics cannot always be made, while the reason for this has not yet been clear.

The above by-product oil obtained from the ethylbenzene preparation process, however, inevitably contains various uncertain compounds that cannot be determined by analysis, as the general characters of the materials of this kind. The kinds and quantities of these undeterminable compounds are not fixed and, in addition, the boiling points of these compounds are close to or overlapped with one another. Accordingly, it is impossible to isolate any component only by distillation from the by-product oil.

In the case that a fraction having a certain boiling point is recovered, the boiling point of the fraction is indicated by the distilling temperature of the fraction. In practice, however, the efficiency of the distillation generally depends upon the distilling conditions such as the number of theoretical plates of distillation apparatus, reflux ratio, bottom temperature and other temperature distribution in a distillation column, and the rate of distillation. Even when the distillation temperatures, that is, the boiling points are the same, the kinds and quantities of components in distilled fractions are liable to vary largely.

Owing to the complexity of the origin of by-product oil and operational factors in the distillation of by-product oil, it is supposed that an electrical insulating oil having excellent characteristics cannot be obtained only by a simple measure of distillation.

BRIEF SUMMARY OF THE INVENTION

In view of the above facts, the present inventors have carried out extensive studies on the preparation of oil-filled capacitors using such by-product oils.

It is, therefore, the primary object of the present invention to provide an oil-filled capacitor which is impregnated with an electrical insulating oil having excellent electrical characteristics that is prepared from the by-product oil in the ethylbenzene preparation.

Another object of the present invention is to provide an oil-filled capacitor which can be produced at low cost without difficulty.

In accordance with the present invention, the oil-filled capacitor is composed of, at least partially, a dielectric substance of plastic material and it is, of course, impregnated with an electrical insulating oil. The oil is characterized in that it comprises 0 to 100% by weight of a fraction A containing components boiling within the range of 268° to 275° C. (atmospheric pressure basis) and 100 to 0% by weight of a fraction B containing components within the range of 280° to 310° C. These fractions are those recovered by distillation from the heavy by-product oil which is produced in the preparation of ethylbenzene by alkylating benzene with ethylene in the presence of an alkylation catalyst and the ratio of the integrated intensity as chemical shift at 120 to 155 ppm of the spectrum measured by $C^{13}$ NMR method to the total integrated intensity at 0 to 155 ppm of the spectrum is 80% or higher with regard to the fraction A and the same ratio is 72% or higher with regard to the fraction B.

The objects and features of the present invention will become more apparent in the following description.

DETAILED DESCRIPTION OF THE INVENTION

The method to prepare ethylbenzene by alkylating benzene with ethylene in the presence of an alkylation catalyst is widely carried out industrially as a method for preparing the raw material of styrene monomer. The by-product oil referred to in the present invention is obtained from such a process for preparing ethylbenzene.

More particularly, a liquid phase alkylation method or a vapor phase alkylation method is generally used for reacting benzene with ethylene. In the liquid phase alkylation method, a Friedel-Crafts catalyst such as aluminum chloride or a Bronsted acid such as p-toluenesulfonic acid or hydrofluoric acid is used. In the vapor phase alkylation method, a synthetic zeolite such as ZSM-5 or phosphoric acid carried on an appropriate carrier is used. The reaction temperatures are generally selected from the range of 20° to 175° C. in the liquid phase alkylation method and 250° to 450° C. in the vapor phase alkylation method.

Through the above reaction, an alkylation product is obtained. This alkylation product comprises unreacted benzene, the aimed ethylbenzene, polyethylbenzene and a heavy by-product oil. The alkylation product is then subjected to the removal of catalyst, neutralization and washing with water as occasion demands according to the conventional method. The by-product oil used in the present invention is then obtained by removing the unreacted benzene, ethylbenzene, and polyethylbenzene by distillation. Because the by-product oil contains tarry substances and in order to facilitate the below-described distillation operation, the by-product oil is previously subjected to rough distillation at a reduced pressure to obtain a fraction covering a temperature range broader than that of the aimed fractions. This fraction obtained in the rough distillation is not especially limited as far as it covers the aimed temperature range. That is, the fraction is selected from the range in distilling temperatures of 255° to 420° C. (atmospheric pressure basis).

From the above by-product oil, the fraction A containing components having a boiling temperature range of 268° to 275° C. (atmospheric pressure basis) and another fraction B containing components having a boiling temperature range of 280° to 310° C. (atmospheric pressure basis) are obtained by precision fractional distillation.

As described above, various undeterminable compounds are contained in the by-product oil from ethylbenzene. When heated, these compounds are liable to polymerize, decompose or isomerize. Furthermore, the by-product oil itself is heavy and high in boiling point. Accordingly, the distillation of the by-product oil must be done under reduced pressures. When it is subjected to distillation at the atmospheric pressure, the foregoing ratios of integrated intensities cannot reach the level of 80% or higher in the fraction A and the level of 72% or higher in the fraction B. Or, even when the ratios reach these values, the characteristics of the electrical insulating oil is quite poor. The sufficient degree of the reduced pressure may be 200 mmHg or lower, and preferably not higher than 50 mmHg. It is undesirable in view of economy to reduce the pressure to an excess. The precision fractional distillation can be carried out either in continuous or in batchwise operation using one or a plurality of distillation columns. The distillation is carried out by regulating the distilling conditions, for example, the number of theoretical plates of distillation column, the bottom temperature and other temperature distribution in the column, the rate of distillation, and other factors, so as to meet the foregoing conditions. It is necessary to use a distillation apparatus of generally 10 or more, preferably 20 or more, in the theoretical number of plates. In the event that the obtained fraction contains substantially no components boiling within the above-mentioned temperature range, the ratios never reach these values and the electrical characteristics of the by-product oil cannot be improved. Accordingly, the distillation conditions are to be selected.

It is inevitable that the ratio of the integrated intensity as chemical shift at 120 to 155 ppm of the spectrum measured by $C^{13}$ NMR method to the total integrated intensity at 0 to 155 ppm of the spectrum is 80% or higher with regard to the fraction A and the same ratio is 72% or higher with regard to the fraction B. In connection with the electrical insulating oil used in the present invention, quite excellent electrical characteristics are exhibited by the constituents of the fraction A or those of the fraction B or by the synergistic effect of both the fractions A and B. In the case that the ratio of the integrated intensity of the spectrum measured by $C^{13}$ NMR method is lower than 80% in the fraction A or the ratio is lower than 72% in the fraction B, such the synergistic effect cannot be expected.

The electrical insulating oil used in the present invention can comprise the above-described fraction A or the fraction B. It is, however, preferable that the electrical insulating oil comprises a mixture of both the fractions.

That is, the preferable electrical insulating oil used for impregnating the oil-filled capacitor is a mixture of 10 to 80%, more preferably 20 to 70%, by weight of the fraction A and 90 to 20%, more preferably 80 to 30%, by weight of the fraction B; and the ratio of the integrated intensity as chemical shift at 120 to 155 ppm of the spectrum measured by $C^{13}$ NMR method to the total integrated intensity at 0 to 155 ppm of the spectrum is 80% or higher with regard to said fraction A and the same ratio is 72% or higher with regard to said fraction B.

In the case that the proportion of the fraction A is less than 10% by weight, that is the proportion of the fraction B is more than 90% by weight, it is less desirable because the corona discharge characteristic of the capacitor which is impregnated with such an electrical insulating oil is impaired. On the other hand, if the proportion of the fraction A exceeds 80% by weight, that is the proportion of the fraction B is less than 20% by weight, it is also less desirable because the low temperature characteristics of the capacitor which is impregnated with such an electrical insulating oil is impaired.

The electrical insulating oil prepared as described above is refined if need be and it is used as an impregnating oil for oil-filled capacitors. The refining can be done in the process of distillation of the by-product oil. Furthermore, in accordance with uses, it is possible to use the electrical insulating oil by mixing it with well known diaryl alkanes, alkyl biphenyls, alkyl naphthalenes and so forth in arbitrary proportions.

The oil-filled capacitor of the present invention is the one in which at least a part of dielectric substance is composed of a plastic film. As the plastic films, those of polyolefins such as polyethylene, polypropylene and polymethylpentene are desirable. Among them, the film made of polypropylene is most preferable. For example, the oil-filled capacitor of the present invention is made by winding a metal foil such as aluminum foil together with polypropylene film, and if necessary also with insulating paper, and impregnating it with the above-described electrical insulating oil according to the conventional method. The oil-filled capacitor in which a metallized plastics film is wound together with a plastic film or insulating paper and then impregnated with an electrical insulating oil is also covered by the present invention.

The determination in $C^{13}$ NMR method will be described. The measuring temperature is generally the room temperature. A fraction to be measured is dissolved into a solvent of deutero chloroform to prepare a solution of 10 to 20% by volume. The frequency of measurement can be varied properly, for example, measurement is done at 67.8 MHz. In the obtained $C^{13}$ NMR spectrum, the integrated intensity between 120 to 155 ppm in chemical shift on the basis of tetramethylsilane is measured and then the ratio (%) of this value to the integrated intensity of the total spectrum (0 to 155 ppm) excluding that of the solvent, is obtained. The numeral on the first decimal place is rounded. In order to improve the quantitative accuracy, the measurement is generally done by the proton complete decoupling method with eliminating the nuclear overhauser effect.

The present invention will be described in more detail with reference to the example of the invention.

EXAMPLE

Alkylation of Benzene

From the liquid phase alkylation process to prepare ethylbenzene by alkylating benzene with ethylene in the presence of aluminum catalyst, an alkylation product was obtained. The alkylation product consisted of 43.0% of unreacted benzene, 11.8% of ethylbenzene, 18.3% of polyethylbenzene and 7.6%, all by weight, of heavy by-product oil. The unreacted benzene, ethylbenzene, and polyethylbenzene were removed by distillation. The remained by-product oil was a viscous black substance. This by-product oil was distilled at a reduced pressure of 10 mmHg to obtain a fraction (hereinafter referred to as "recovered fraction") of 255° to 420° C. in distilling temperature (atmospheric pressure basis).

The following fractions were separated from this recovered fraction.

Fraction A

To the bottom of precision fractional distillation column was fed 1600 lit. of the recovered fraction and fractional distillation was carried out at reduced pressure of 5 to 15 mmHg to obtain a fraction A of 268° to 275° C. (atmospheric pressure basis) in distilling temperature.

Packed column:
 Diameter 400 mm. Height: 10.4 m.
 Theoretical number of plates: 25.

Fraction B

The recovered fraction was distilled using the above distillation column in the like manner as the above to obtain a fraction B of 280° to 310° C. (atmospheric pressure basis) in distilling temperature.

Fraction A-1

To the bottom of the following distillation column was fed 1600 lit. of the recovered fraction and fractional distillation was carried out under a reduced pressure below the atmospheric pressure by not less 250 mmHg to obtain a fraction A-1 of 268° to 275° C. (atmospheric pressure basis) in distilling temperature.

Packed column:
 Diameter: 400 mm Height: 4.0 m.
 Theoretical number of plates: 5.

Fraction B-1

The recovered fraction was distilled using the above distillation column in the like manner as the above to obtain a fraction B-1 of 280° to 310° C. (atmospheric pressure basis) in distilling temperature.

Measurement by $C^{13}$ NMR Method

Measurement was carried out at the room temperature using a $C^{13}$ NMR measuring apparatus of Model GX-270 made by Japan Electron Optics Laboratory Co., Ltd. Each fraction was dissolved in a solvent of deutero chloroform to prepare solutions of 15% concentration. The frequency of measurement was 67.8 MHz.

In order to improve the quantitative accuracy, the measurement was done by the proton complete decoupling method with eliminating the nuclear overhauser effect.

In the obtained $C^{13}$ NMR spectrum, the ratio of integrated intensity of 120 to 155 ppm in chemical shift to the total integrated intensity of the spectrum (0 to 155 ppm) was obtained with regard to each fraction. The results of them are shown in the following Table 1. The standard for the chemical shift was tetramethylsilane.

Compatibility with Polypropylene Film

Polypropylene films (14 micrometer thick) that were cut into a certain shape, were soaked in the respective fractions at 80° C. for 72 hours. After that, the films were taken out and the percentages of changes in volumes of the films were measured, the results of which are shown in Table 1. The smaller value, i.e. the smaller volume change indicates the excellence in size stability, which means that the relevant oil is good in the adaptability to the polypropylene film.

Measurement of Corona Starting Voltage (CSV) and Corona Ending Voltage (CEV)

A two-ply polypropylene film (each 14 micrometer thick) as a dielectric substance and aluminum foil as an electrode were put together in layers and wound according to the ordinary method to obtain model capacitors for oil impregnation.

The model capacitors were impregnated with each fraction in vacuo to obtain oil-filled capacitors of 0.4 microfarad in electrostatic capacity.

The corona starting voltages and corona ending voltages of these capacitors at 25° C. were measured. The results are shown in Table 1.

Life Test for Capacitors

A two-ply polypropylene film (each 14 micrometer thick) as a dielectric substance and aluminum foil as an electrode were put together in layers and wound according to the ordinary method to obtain model capacitors for oil impregnation.

The model capacitors were impregnated with each fraction in vacuo to obtain oil-filled capacitors of 0.4 microfarad in electrostatic capacity.

These capacitors were applied with prescribed AC voltages at $-35°$ C. and the time lengths until the capacitors were broken down were measured to estimate the lives of capacitors. In this case, the potential gradients were initiated from 60 V/$\mu$ and raised by 10 V/$\mu$ at every 48 hours, where the numbers of broken capacitors were counted. The numbers of capacitors that were used for the test were respectively 10. The results are shown in the following Table 2.

It will be understood from the results in tables, the fraction A and the fraction B are superior to the recovered fraction even when they are used singly.

By mixing the fraction A and the fraction B, the corona discharge characteristics at the low temperature and the lives of the oil-filled capacitors can be improved as compared with the use of a single fraction A or fraction B.

Furthermore, in the fractions in which the ratios of integrated intensities of $C^{13}$ NMR method are less than 80% or 72%, it is apparent that the synergistic effect between the fractions A and B cannot be exhibited.

TABLE 1

| Insulating Oil No. | Composition (Wt. Ratio) (Frct: Fraction) | | Ratio by $C^{13}$ NMR Method (%) | Swelling of Film (%) | Corona Discharge Characteristic at $-35°$ C. | |
|---|---|---|---|---|---|---|
| | | | | | CSV | CEV |
| 1 | Frct A (100) | Frct B (0) | 81 | 7.0 | 2290 | 1380 |
| 2 | Frct A (75) | Frct B (25) | 79 | 7.1 | 2910 | 1900 |
| 3 | Frct A (50) | Frct B (50) | 77 | 7.2 | 2690 | 1740 |
| 4 | Frct A (20) | Frct B (80) | 75 | 7.3 | 2610 | 1710 |
| 5 | Frct A (0) | Frct B (100) | 73 | 7.4 | 2520 | 1650 |
| 6 | Frct A-1 (100) | Frct B-1 (0) | 75 | 8.1 | 2190 | 1280 |
| 7 | Frct A-1 (50) | Frct B-1 (50) | 72 | 8.3 | 2320 | 1340 |

TABLE 1-continued

| Insulating Oil No. | Composition (Wt. Ratio) (Frct: Fraction) | | Ratio by $C^{13}$ NMR Method (%) | Swelling of Film (%) | Corona Discharge Characteristic at $-35°$ C. | |
|---|---|---|---|---|---|---|
| | | | | | CSV | CEV |
| 8 | Frct A-1 (0) | Frct B-1 (100) | 68 | 8.5 | 2430 | 1420 |
| 9 | Recovered Fraction | | — | 9.5 | 1960 | 1290 |

TABLE 2

Life Test at $-35°$ C.
(Number of Capacitors Broken Down)

| Insulating Oil No. | Potential Gradient (V/μ) | | | | | | |
|---|---|---|---|---|---|---|---|
| | 60 | 70 | 80 | 90 | 100 | 110 | 120 |
| 1 | — | — | 8 | 2 | — | — | — |
| 2 | — | — | — | — | — | 1 | 9 |
| 3 | — | — | — | — | 1 | 8 | 1 |
| 4 | — | — | — | — | 2 | 8 | — |
| 5 | — | — | 2 | 8 | — | — | — |
| 6 | — | 3 | 6 | 1 | — | — | — |
| 7 | — | — | 7 | 3 | — | — | — |
| 8 | — | — | 2 | 8 | — | — | — |
| 9 | 2 | 6 | 2 | — | — | — | — |

What is claimed is:

1. An oil-filled capacitor comprising:
a dielectric substance of plastic material and impregnated with an electrical insulating oil, said oil comprising:
   (a) 10 to 80% by weight of a fraction A, and
   (b) 90 to 20% by weight of a fraction B:
said fractions A and B having been recovered from the heavy by-product oil that is produced in the preparation of ethylbenzene by alkylating benzene with ethylene in the presence of an alkylation catalyst by fractionally distilling said heavy by-product oil under a reduced pressure of 200 mm Hg maximum and other distillation conditions effective to provide:
said fraction A consisting essentially of components boiling within the range of 268° to 275° C. (atmospheric pressure basis) and the ratio of the integrated intensity as chemical shift at 120 to 155 ppm of the spectrum measured by $C^{13}$ NMR method to the total integrated intensity at 0 to 155 ppm of the spectrum is 80% or higher, and
said fraction B consisting essentially of components boiling within the range of 280° to 310° C. (atmospheric pressure basis) and the ratio of the integrated intensity as chemical shift at 120 to 150 ppm of the spectrum measured by $C^{13}$ NMR method to the total integrated intensity at 0 to 155 ppm of the spectrum is 72% or higher.

2. The oil-filled capacitor in claim I, wherein said plastic material is polyolefin.

3. The oil-filled capacitor in claim 1, wherein said capacitor is made by winding at least a plastic film and a metal foil.

4. The oil-filled capacitor in claim 1, wherein said alkylation catalyst is a Friedel-Crafts catalyst.

5. A method for producing an oil-filled capacitor comprising a dielectric substance of plastic material, said method comprising:
fractionally distilling the heavy by-product oil which is produced in the preparation of ethylbenzene by alkylating benzene with ethylene in the presence of an alkylation catalyst under a reduce pressure of 200 mm Hg maximum and distillation conditions effective to provide an electrical insulating oil comprising:
   (a) a fraction A containing components boiling within the range of 268° to 275° C. (atmospheric pressure basis) and the ratio of the integrated intensity as chemical shift at 120 to 155 ppm of the spectrum measured by $Cl^{13}$ NMR method to the total integrated intensity at 0 to 155 ppm of the spectrum is 80% or higher, and
   (b) a fraction B containing components boiling within the range of 280° to 310° C. (atmospheric pressure basis) and the ratio of the integrated intensity as chemical shift at 120 to 155 ppm of the spectrum measured by $C^{13}$ method to the total integrated intensity at 0 to 150 ppm of the spectrum is 72% or higher;
   (c) combining 10–80% by weight of fraction A and 90–20% by weight of fraction B to provide an electrical insulating oil; and
   (d) impregnating a capacitor element with the electrical insulating oil.

6. The method for producing an oil-filled capacitor in claim 5, wherein said plastic material is polyolefin.

7. The method for producing an oil-filled capacitor in claim 5, wherein said capacitor is made by winding at least a plastic film and a metal foil.

8. The method for producing an oil-filled capacitor in claim 5, wherein said alkylation catalyst is a Friedel-Crafts catalyst.

* * * * *

UNITED STATES PATENT AND TRADEMARK OFFICE
CERTIFICATE OF CORRECTION

PATENT NO. : 4,870,221
DATED : September 26, 1989
INVENTOR(S) : Atsushi Sato, et al.

It is certified that error appears in the above-identified patent and that said Letters Patent is hereby corrected as shown below:

Column 8, line 9, Claim 2: "claim I," should read as --claim 1,--

Signed and Sealed this

Twenty-fifth Day of September, 1990

Attest:

HARRY F. MANBECK, JR.

Attesting Officer

Commissioner of Patents and Trademarks